United States Patent [19]
Yoo

[11] Patent Number: 4,890,950
[45] Date of Patent: Jan. 2, 1990

[54] POSITIONING JOINT FOR A FOLDING LADDER

[76] Inventor: Hoe G. Yoo, Deungchon-Dong, Kangseu-ku, Seoul, Rep. of Korea

[21] Appl. No.: 268,447

[22] Filed: Nov. 8, 1988

[30] Foreign Application Priority Data

Jun. 20, 1988 [KR] Republic of Korea ............... 9442

[51] Int. Cl.$^4$ ............................................. F16C 11/00
[52] U.S. Cl. ...................................... 403/96; 182/163; 16/328
[58] Field of Search .................... 403/96, 92, 93, 24; 182/163; 16/329, 328, 331, 353

[56] References Cited

U.S. PATENT DOCUMENTS

| | | | |
|---|---|---|---|
| 4,339,844 | 7/1982 | Shatters | 403/96 X |
| 4,403,373 | 9/1983 | Kummerlin | 16/328 X |
| 4,540,306 | 9/1985 | Wang | |
| 4,666,327 | 5/1987 | Su et al. | 403/96 X |

*Primary Examiner*—Andrew V. Kundrat
*Attorney, Agent, or Firm*—Armstrong, Nikaido, Marmelstein, Kubovcik & Murray

[57] ABSTRACT

A positioning joint for a folding ladder including a pair of first joint members each of which having an axial hole and a pair of locking holes, a second joint member having an axial hole and several pairs of positioning holes, a button mechanism having an axial shaft for combining a locking member and a coil spring being placed around the shaft, and a locking member having a pair of locking bars. The two joint members are relatively pivotable about a bushing passing through the axial holes thereof and are lockable in a series of predetermined angular positions by engaging the locking bars into the locking holes and positioning holes by means of the button mechanism and locking member.

2 Claims, 4 Drawing Sheets

POSITIONING JOINT FOR A FOLDING LADDER

BACKGROUND OF THE INVENTION

This invention relates to a positioning joint for a folding ladder.

In a conventional positioning joint for a folding ladder, the folding or unfolding of the ladder to a desired angular position is performed by a rachet acting to permit or hinder engagement of a locking element in the respective notches by disclosing or closing the appropriate notch. A joint of this type raises concerns about the safety of such a joint because of potential malfunctions of the rachet.

Another prior art joint for a folding ladder utilizes a clawed control means, as set forth in U.S. Pat. No. 4,540,306, but which has a drawback in that it malfunctions easily unless the user exercises great care in operating the ladder to the desired angular position and a further disadvantage in that it is difficult to manufacture the joint because of the use of a tension spring.

A further positioning joint for a folding ladder is set forth in U.S. patent application Ser. No. 106,818 in which two joint members are relatively pivotable about a common axis, and are lockable in a series of predetermined angular positions by engaging a locking device provided within one member in notches formed at the peripheral edge of the other member, under the control of a guide-disc plate.

Although this type positioning joint insures safety in use while being easy to operate, it has a drawback in that its construction is somewhat complex and costly to manufacture, and has a further disadvantage in that it sometimes has problems in use while being difficult to repair.

SUMMARY OF THE INVENTION

Accordingly, a principal object of the present invention is to provide an improved positioning joint for a folding ladder, which will reduce or eliminate the aforementioned defects, be able to improve productivity with a simple construction, and be trouble-free.

According to the present invention, the positioning joint for a folding ladder comprises a pair of first joint members, a second joint member, a locking member and a button mechanism Each of the first joint members comprises a circular plate having an axial hole and a pair of locking holes in the opposite positions radially of the axial hole, and a fixing portion to be fixed to a ladder frame. The circular plate of one of the first joint members further comprises a plurality of perforations for fixing the end of a coil spring to be contracted.

The second joint member comprises a circular plate having an axial hole and several pairs of positioning holes for allowing a pair of locking bars to pass therethrough, and a fixing portion to be fixed to a ladder frame.

The button mechanism comprises an axial shaft having a pin hole at the end thereof for combining with a locking member, and a coil spring being placed around the shaft.

The locking member comprises a pair of locking bars each of which have a notch therein for preventing the locking bars from locking into the locking holes and the positioning holes when the joint is folded, and a body portion having a central opening for receiving the shaft and a pin hole for combining the shaft to the body portion by inserting a pin thereinto.

The first and second joint members are pivotally interconnected as a unit by a bushing passing through the axial holes and combining the shaft of the button mechanism passing through the bushing to the body portion of the locking member by inserting the pin into the aligned pin holes.

Other features and operations of the present invention will become apparent from the following detailed description of the invention when taken in conjunction with the accompanying drawings.

BRIEF DESCRIPTION OF THE DRAWINGS

The above and other objects and the attendant advantages of the present invention will become readily apparent by reference to the following detailed description when considered in conjunction with the accompanying drawings wherein.

DESCRIPTION OF THE INVENTION

Figure 1:
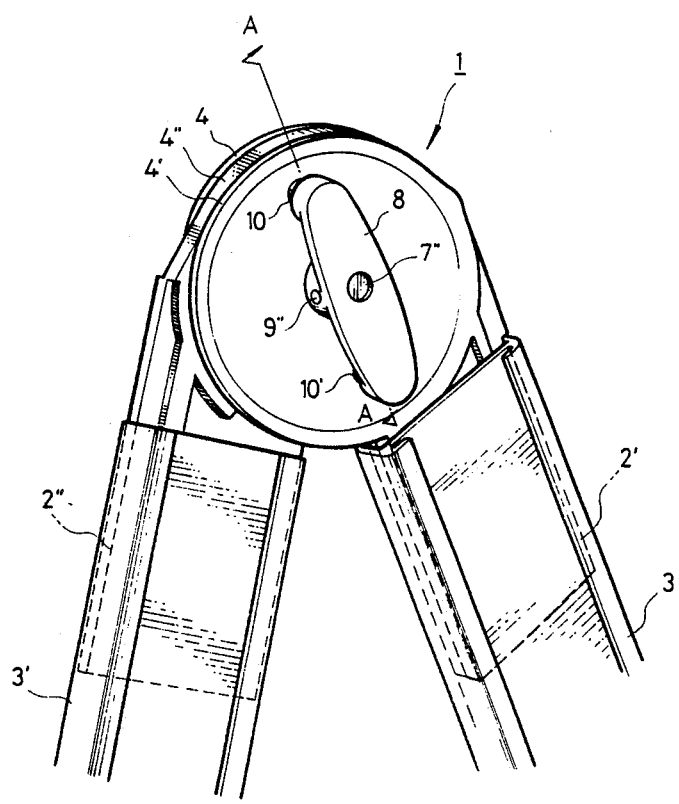
FIG. 1 is a perspective view of the positioning joint for a folding ladder according to the invention.
Figure 2:
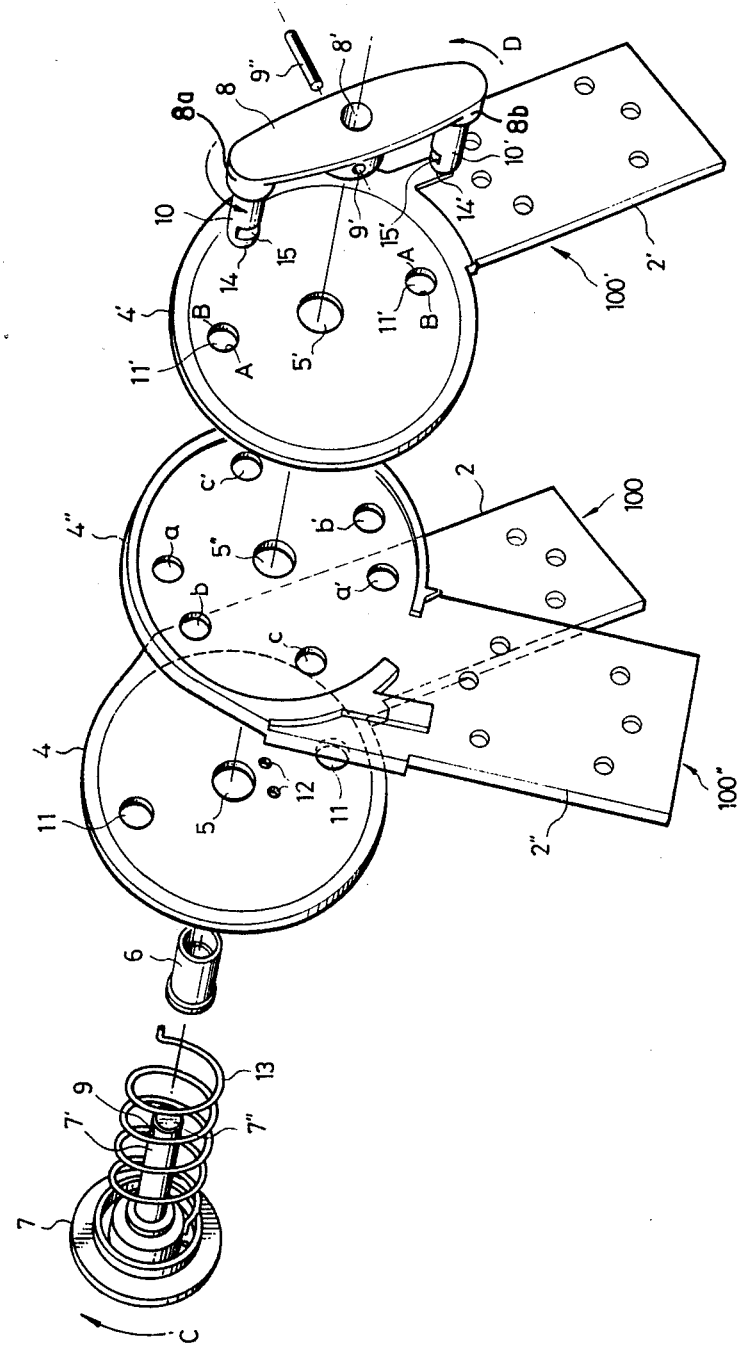
FIG. 2 is an exploded perspective view of the positioning joint of FIG. 1.

The positioning joint 1 for a folding ladder according to the invention comprises, as shown in FIGS. 1 and 2, a pair of first joint members 100, 100', a second joint member 100'', a locking member 8 and a button mechanism 7.

Referring to FIG. 2, each of the first joint members 100, 100' may be formed, for example, of sheet metal pressed into the shape of a circular plate 4 or 4' having an axial hole 5 or 5' for pivotally interconnecting the plates 4,4' as a unit to firmly hold the second joint member 100'' therebetween and a pair of locking holes 11 or 11', and a fixing portion 2 or 2' having a plurality of apertures through which the upper end of a first ladder frame (not shown) is fixed, a pair of locking holes 11 in plate 4 being always aligned with a pair of locking holes 11' in plate 4' regardless of the angular position for folding or unfolding. One first joint member 100 further comprises a plurality of perforations 12 compared with the other first joint member 100' for fastening one end of a coil spring 13 of the button mechanism 7.

The second joint member 100'' comprises a circular plate 4'' having an axial hole 5'' and three pairs of positioning holes a, a'; b, b'; c, c' for allowing a pair of locking bars 10, 10' of the locking member 8 to pass therethrough, and a fixing portion 2'' having a plurality of apertures through which the joint member is fixed to a second ladder frame (not shown).

The button mechanism 7 is formed with an axial shaft 7' having a pin hole 9 at one end thereof for combining with the locking member 8, and a coil spring 13 being placed around the shaft 7' and having its other end anchored in the button member.

The locking member 8 comprises a body portion and pair of locking bars 10, 10' each of which having a notch 15 or 15' on its end 14, 14' on the approaching side when the joint is unfolded. The body portion has a central opening 8' for receiving axial shaft 7' of button mechanism, a pin hole 9' for receiving a pin 9" thereinto so as to combine the shaft 7' to the body portion and a pair of tubular protrusions 8a, 8b to which the locking bars 10, 10' are fixed.

The joint members 100, 100,' 100" are pivotally interconnected as a unit by combining the button mechanism 7 and the locking member 8. That is, each inner side of the first joint members 100, 100' is faced with both sides of the second joint member 100", respectively aligning the axial holes 5, 5', 5" to each other by inserting a bushing 6 thereinto. One end of coil spring 13 placed around the shaft 7' is fixed to the circular plate of the first joint member 100 by inserting it into one of the perforations 12, and then the shaft 7' passes through the bushing 6 and is coupled to the locking member 8 by inserting a pin 9" into the aligned pin holes 9, 9' causing coil spring 13 to be compressed against the circular plate of the first joint member 100 and the locking bars 10, 10' to be positioned in the respective locking holes 11, 11'.

The operation of the aforedescribed construction of the positioning joint according to the invention will be explained in detail hereinafter with reference to FIGS. 2 to 6.

Figure 4:
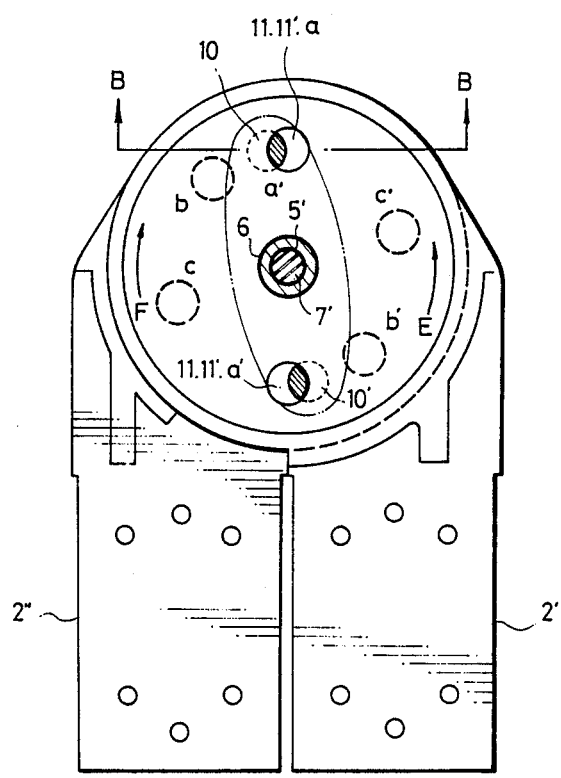
FIG. 4 is a front view of the positioning joint, showing fully folded joint members.
Figure 5:
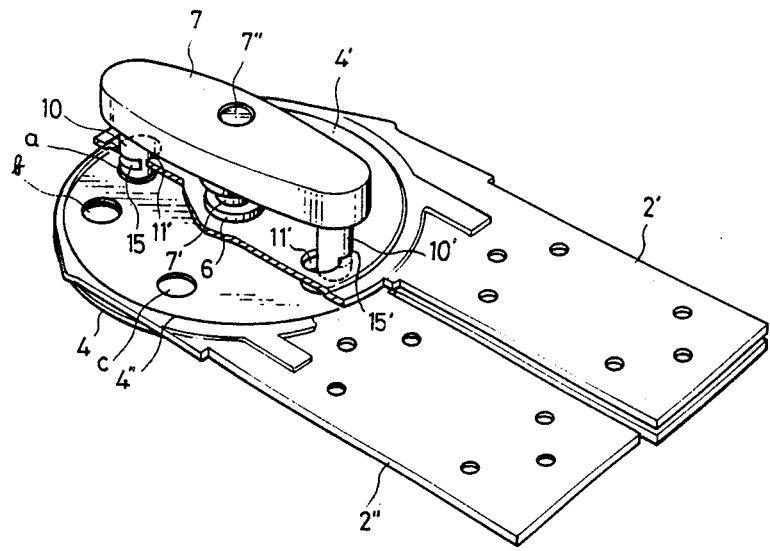
FIG. 5 is a partially cutaway perspective view of FIG. 4.
Figure 6:
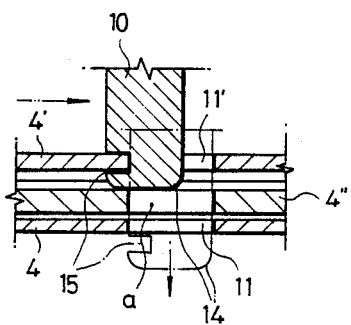
FIG. 6 is an enlarged cross-sectional view taken on line B—B of FIG. 4 with additional phantom line showing a locking bar locked into a locking hole.

FIG. 4 is a front view of the positioning joint showing fully folded joint members in that notches 15, 15' of a pair of locking bars 10, 10' inserted into the respective locking holes 11' of the first joint member 100' are engaged with the A sides of locking holes 11' due to the returning force of coil spring 13 as shown in solid line in FIG. 6.

To unfold the positioning joint from the fully closed position of FIG. 4 to a position in which a pair of locking bars 10, 10' will be engaged into a pair of positioning holes b, b' and a pair of locking holes 11, upon manually extending the first and second joint members' fixing portions 2, 2' and 2" in the opposite direction to each other, the circular plate of the second joint member 100" is turned in a clockwise direction while the circular plates of the first joint members 100, 100' are turned in a counter-clockwise direction with the pair of locking bars 10, 10' faced to the B sides of locking holes 11' of the first joint member 100' by frictional engagement of the ends of the locking bars with the second joint member circular plate until the locking holes 11, 11' are aligned with the posit holes b, b'.

Figure 3:
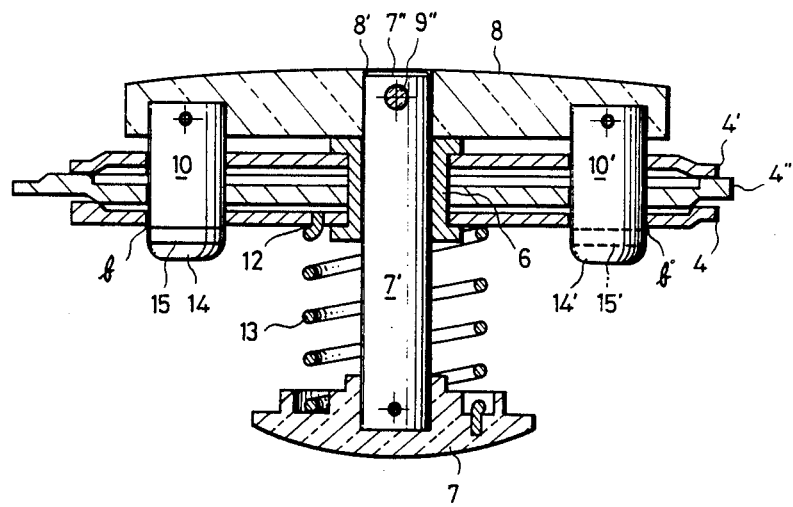
FIG. 3 is an enlarged cross-sectional view taken on line A—A of FIG. 1.

Upon such an alignment, the button mechanism 7 is released due to the restoring force of coil spring 13 and consequentially the locking bars 10, 10' pass through the locking holes 11, 11' and the positioning holes b, b', as shown in FIG. 3. As a result, the positioning joint is unfolded about 40 degrees with respect to each other.

If it is intended to unfold the positioning joint further, the button mechanism 7 is pressed against coil spring 13 so as to unlock the locking bars 10, 10' out of their engaging hole 11 and positioning holes b, b', thereby returning the coil spring 13 turned by pushing of B sides of locking holes 11'. Then by rotating the button mechanism 7 as well as locking member 8 in the counter-clockwise direction. notches 15, 15' of the locking bars 10, 10' are engaged with the A sides of locking holes 11' of the first joint member 100' Upon manually extending the first and second joint members' fixing portions 2, 2' and 2" in the opposite direction to each other, the same operations as aforementioned are repeated. Accordingly, the positioning joint is now unfolded about 105 degrees with respect to each other.

If it is intended to unfold the positioning joint further to lock the locking bars 10, 10' into positioning holes c, c', the positioning joint can be unfolded completely by the same operating principle as aforedescribed.

The operation of folding the positioning joint is as follows. Upon pressing the button mechanism 7, the locking bars 10, 10' of locking member 8 are unlocked out of their engaging holes thereby rotating the button mechanism 7 in the opposite direction of the arrow C in FIG. 2 and the locking member 8 in the direction of the arrow D in FIG. 2 by the contractile force of coil spring 13 until notches 15, 15' of locking bars 10, 10' are engaged with the A sides of locking holes 11' of the first joint member 100' as shown in FIG. 6 showing a phantom line locking bar locked into holes and a solid line-locking bar unlocked and engaged with the A side of locking hole 11'.

In this condition when the position joint is folded, the locking bars 10, 10' of locking member 8 are able to pass by the positioning holes a, a'; c, c'; b, b' successively without being locked by them, because the notches 15, 15' of locking bars 10, 10' are engaged with the A sides of locking holes 11' of the first joint member 100'. As a result, the positioning joint according to the present invention can be folded rapidly. In order to maintain the positioning joint firmly in the fully closed position, if the locking member 8 is turned in the clockwise direction from the position in FIG. 4, the positioning joint is locked in the fully closed position.

As can be seen from the foregoing, the positioning joint according to the present invention is not only easily but also safely unfolded and folded to a desired angular position.

Further, the present invention provides an improved positioning joint with increased productivity due to simple construction, reduces the cost to manufacture, and can be used without trouble.

While the invention has been illustrated and described with one embodiment, it is recognized that variations and changes can be made without departing from the scope and spirit of the invention as set forth in the claims.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A positioning joint for a folding ladder comprising:
   a pair of first joint members each having a first circular plate and a fixing portion to be fixed to a ladder frame, each said first circular plate being formed with an axial hole and a pair of locking holes for engaging with locking bars;
   a second joint member having a second circular plate and a fixing portion to be fixed to a ladder frame, said second circular plate being formed with an axial hole, and several pairs of positioning holes for allowing a pair of locking bars to pass therethrough;
   a button mechanism having an axial shaft formed with a pin hole at the end thereof for combining with a locking member and a coil spring being placed around the shaft;

a locking member having a pair of locking bars each of which is formed with a notch thereon, and a body portion formed with a central opening for receiving said axial shaft and a pin hole for combining the shaft to the body portion by inserting a pin thereto;

said first and second joint members being pivotally interconnected together by a bushing passing through the axial holes hereof and combining the shaft of button mechanism passing through the bushing to the body portion of locking member by inserting the pin into the aligned pin holes 2. The positioning joint according to claim 1, wherein said first circular plate of one of the first joint members is formed with a plurality of perforations for fixing the end of the coil spring to be contracted.

* * * * *